United States Patent [19]

Rapp et al.

[11] 4,175,857
[45] Nov. 27, 1979

[54] PHOTOGRAPHIC COPYING MACHINE

[75] Inventors: Heinz Rapp, Munich; Ernst Biedermann, Taufkirchen; Dieter Wittenbrink, Munich, all of Fed. Rep. of Germany

[73] Assignee: AGFA-Gevaert, A.G., Leverkusen, Fed. Rep. of Germany

[21] Appl. No.: 870,604

[22] Filed: Jan. 18, 1978

[30] Foreign Application Priority Data

Jan. 19, 1977 [DE] Fed. Rep. of Germany ....... 2701943

[51] Int. Cl.² ............................................... G03B 27/60
[52] U.S. Cl. ..................................... 355/73; 248/362; 248/363
[58] Field of Search ............................ 355/73, 85, 76; 248/362, 363

[56] References Cited

U.S. PATENT DOCUMENTS

| 2,814,233 | 11/1957 | Anander | 355/73 |
| 2,933,014 | 4/1960 | Anander | 355/73 |
| 3,229,953 | 1/1966 | Muir, Jr. | 355/73 X |
| 3,545,860 | 12/1970 | Hutchins | 355/73 X |
| 4,089,603 | 5/1978 | Jacobs | 355/73 |

*Primary Examiner*—Richard A. Wintercorn
*Attorney, Agent, or Firm*—Peter K. Kontler

[57] ABSTRACT

Apparatus for transferring photosensitive sheets from the transporting plane into the copying plane of a photographic copying machine has a suction chamber with a perforated cover having a flat upper side which defines the copying plane. The interior of the suction chamber is subdivided into one or more centrally located primary sections which are in direct communication with the intake of a suction pump and two or more secondary sections which communicate with the primary section or sections by way of narrow passages defined by internal partitions of the suction chamber so that a sheet which is advanced in the transporting plane to a position of register with the cover is attracted first to that portion or those portions of the cover which overlie the primary section or sections and thereupon to those portions of the cover which overlie the secondary sections. The number of primary and secondary sections which communicate with the intake of the suction pump is reduced when the apparatus is used for transfer of smaller sheets. The number of perforations per unit area of that portion of the cover which overlies the primary section or sections is greater than the number of perforations per unit area of that portion of the cover which overlies the secondary sections, and the combined cross-sectional area of perforations in communication with the primary section or sections is greater than the combined cross-sectional area of passages between the primary and secondary sections.

22 Claims, 2 Drawing Figures

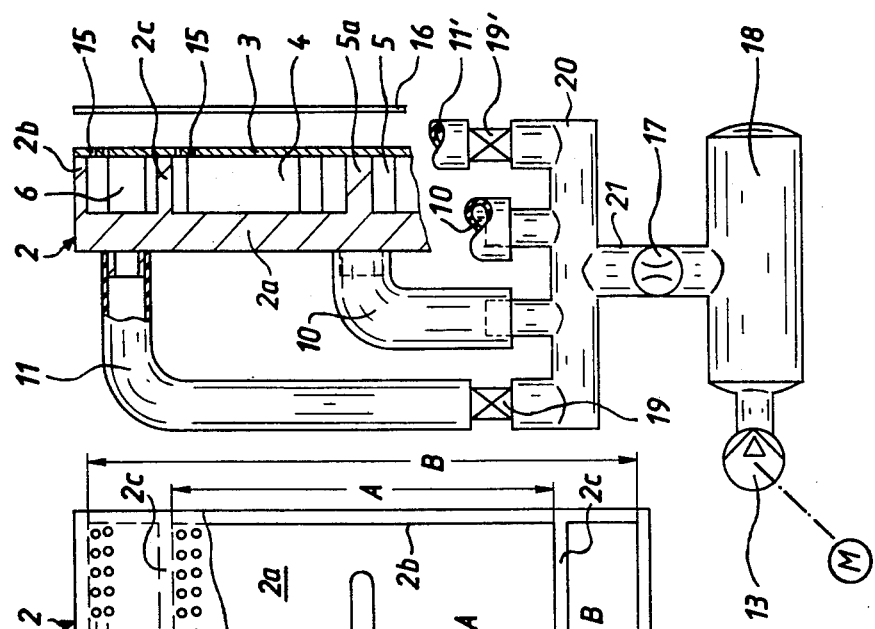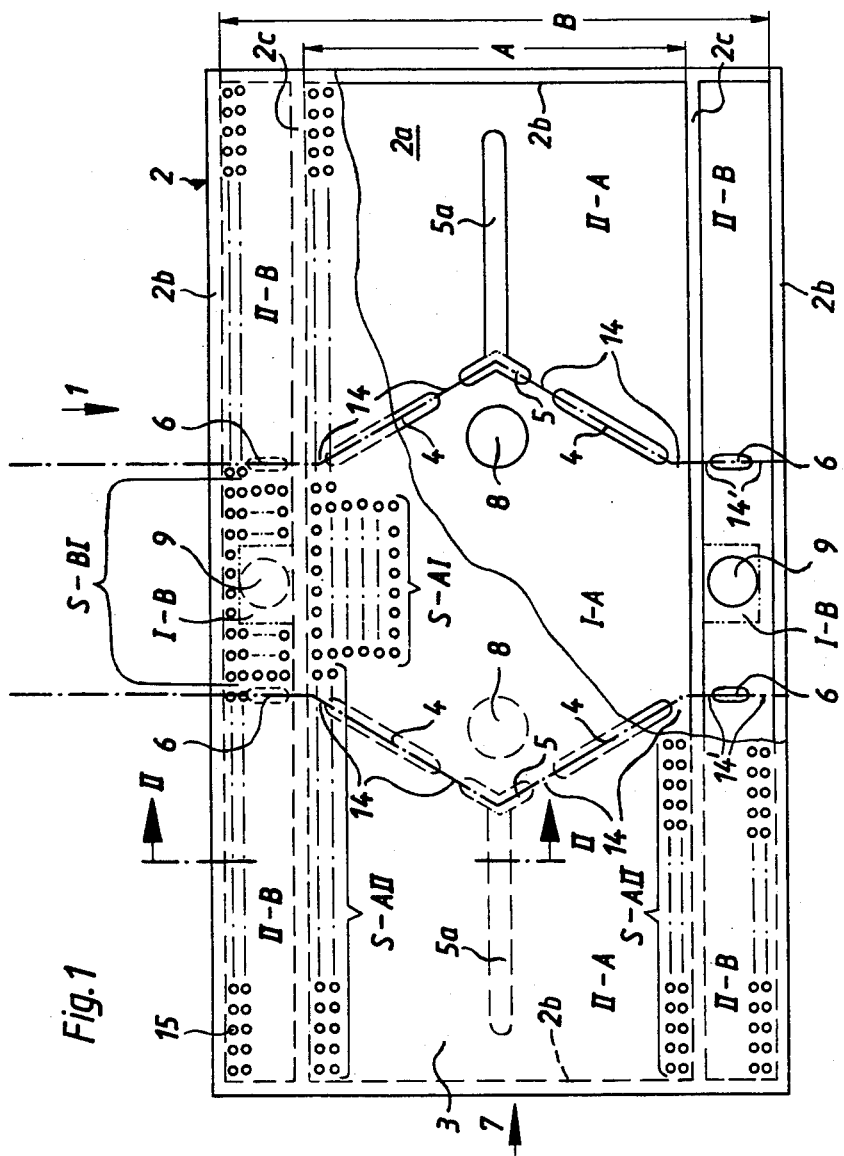

PHOTOGRAPHIC COPYING MACHINE

BACKGROUND OF THE INVENTION

The present invention relates to copying machines in general, and more particularly to improvements in apparatus for maintaining sheets or webs of photosensitive material in a predetermined plane during exposure to light at the copying station of a copying machine. Still more particularly, the invention relates to improvements in apparatus for transferring and maintaining sheets or webs of photosensitive material, especially relatively large sheets or webs, in a predetermined (copying) plane by resorting to suction generating means.

Photosensitive material which is exposed to light in a photographic copying machine is normally transported in the form of elongated webs. Such webs must be supported and guided to insure convenient stepwise transport for placing of successive coherent portions or sheets of the web into register with various instrumentalities at the copying station. As a rule, the areas to be exposed to light must be moved into a predetermined plane in order to insure the making of sharp exposures. The transport and proper positioning of portions of relatively small (narrow) webs present no problems; such webs can be readily held in requisite position by mechanical clamping, holding and/or pressing devices. However, mechanical devices are unsatisfactory for reliable positioning of relatively large webs (e.g., webs consisting of coherent sheets having a width of up to 30 centimeters) in a predetermined plane during exposure to copying light.

German patents Nos. 1,146,741, 1,065,271 and 1,187,122 disclose apparatus with means for attracting sheets to a supporting surface which is located in a predetermined plane by resorting to suction generating devices. A drawback of the patented apparatus is that proper retention of sheets in preselected planes can be insured only by resorting to large-capacity pumps in order to guarantee predictable transfer of sheets from the transporting plane (i.e., from the path along which the sheets are transported toward and beyond the copying station) to the copying plane. A high-capacity pump (and/or its motor) invariably produces considerable noise which is bothersome to the attendants. Moreover, the energy requirements of suction generating means are extremely high and the sheet (e.g., a portion of a continuous web) which is transferred from the transporting plane into the copying plane is likely to develop folds, creases, pleats or other surface irregularities which affect the quality of reproductions. The likelihood of development of folds or the like is especially pronounced immediately after the copying machine is started and also when the machine is designed in such a way that the sheet is illuminated from below. In such machines, the sheet is likely to form a relatively small loop which hangs downwardly beyond the positive plane. As a rule, the marginal portions of the sheet are attracted first whereby the median portion of the sheet exhibits a bulge or fold, i.e., the median portion does not lie flat against the platform which serves to maintain the sheet in an optimum position for exposure to light.

OBJECTS AND SUMMARY OF THE INVENTION

An object of the invention is to provide a novel and improved apparatus for transferring sheets from a first into a second plane by establishing a pressure differential between the opposite sides of sheets.

Another object of the invention is to provide an apparatus which can be rapidly converted for transfer of smaller or larger sheets and which can transfer sheets without the formation of pleats, folds, creases and/or other irregularities.

A further object of the invention is to provide an apparatus whose energy requirements are a small fraction of energy requirements of presently known apparatus for transfer of sheets by suction.

An additional object of the invention is to provide the apparatus with a novel and improved suction chamber.

Another object of the invention is to provide novel and improved means for evacuating air from the suction chamber.

A further object of the invention is to provide an apparatus of the above outlined character which is especially suited for transfer of sheets, e.g., coherent portions of a continuous or elongated web of photosensitive material, from the transporting plane into the copying plane of a photographic copying machine.

Another object of the invention is to provide an apparatus which invariably insures adherence of each and every portion of a smaller or larger sheet to the flat surface of a suction chamber to thus locate the sheet in the copying plane of a photographic copying machine prior to exposure to light.

The invention is embodied in an apparatus for transferring sheets from a predetermined position in a first plane into a second plane, particularly for transferring photosensitive sheets into the copying plane of a photographic copying machine. The apparatus comprises a suction chamber including a perforated wall (such wall may constitute a platform-like top wall or cover of the suction chamber) having an outer side which defines the second plane and is in register with a sheet occupying the predetermined position in the first plane, a suction pump or analogous means for evacuating air from the chamber (by a route other than the perforations of the wall) whereby air which flows into the chamber by way of perforations in the wall attracts and effects the transfer of a sheet from the predetermined position in the first plane into the second plane (i.e., such sheet lies flat against the outer side of the wall), and one or more partitions or analogous means for subdividing the interior of the suction chamber into at least two groups of sections each of which communicates with the evacuating means and with the respective perforations of the wall. The subdividing means includes one or more elements (e.g., the aforementioned partitions) which offer lesser (i.e., less pronounced) resistance to the outflow of air from each section of one of the groups of sections and a greater (i.e., more pronounced) resistance to the outflow of air from the sections of the other group whereby that portion of a sheet in the predetermined position which is adjacent to perforations communicating with the one group of sections is transferred into the second plane prior to transfer of that portion of the sheet which is adjacent to perforations communicating with the other group of sections.

The first plane may constitute a transporting plane wherein the sheets are movable stepwise in a predetermined direction, and the one group of sections preferably extends transversely of such direction. The sheets may constitute portions or frames of an elongated or continuous ribbon or web of photographic paper or film.

That portion of the outer side of the wall which overlies the one group of sections (the one group may include a single section and the other group may include two sections which are located at the opposite sides of the single section) may be a small fraction (e.g., between 5 and 15 percent) of the area of that portion of the outer side of the wall which overlies the other group of sections.

The lesser resistance may be zero or close to zero which means that, during the first stage of transfer of a sheet from the predetermined position into the second plane, the flow of air into and from the other group of sections is zero or nearly zero, and such flow begins only when a substantial number of perforations which communicate with the one group of sections is sealed by the transferred portion of the sheet.

The evacuating means may comprise a suction pump, another suction generating device or a combination of a suction pump with a vessel from which the pump evacuates air during intervals between movements of successive sheets to the predetermined position. The vessel communicates with the one group of sections in response to opening of one or more valves so that the flow of air into the one group of sections via respective perforations begins abruptly as soon as the valve or valves establish communication between the vessel and the one group of sections. The pressure in the vessel thereby rises so that suction in the other group of sections is less pronounced than suction in the one group of sections during the initial stage of transfer of a sheet into the second plane. This is actually desirable because the pressure differential which is needed for transfer of the remaining portion of a sheet into the second plane is much lower than that which must be applied to effect satisfactory transfer of the first portion of a sheet, i.e., the transfer of that portion which must be transferred from the second plane and all the way against the outer side of the wall immediately after establishment of communication between the pump or vessel and the one group of sections.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary plan view of an apparatus which embodies the invention, with certain parts shown broken away; and FIG. 2 is a fragmentary transverse vertical sectional view as seen in the direction of arrows from the line II—II of FIG. 1.

DESCRIPTION OF THE PREFERRED EMBODIMENTS

The apparatus 1 which is shown in the drawing comprises a plate-like platform 3 which is formed with perforations or ports 15 and whose exposed outer side determines the plane of a photosensitive sheet (e.g., a sheet 16) when the latter is transferred from a transporting plane (the sheet 16 of FIG. 2 is assumed to be located in such transporting plane) to a second or copying plane in which the sheet lies flat against the exposed outer side of the platform 3 and is located in the copying plane, i.e., in an optimum position for exposure to light. The platform 3 is adjacent to the open side of a housing 2 which constitutes therewith a composite suction chamber having several compartments which, in turn, are subdivided into smaller compartments or sections. The housing 2 comprises a bottom wall 2a which is spaced apart from and is preferably parallel to the platform 3, several side walls or end walls 2b which abut against the marginal portions of the platform 3, and several intermediate walls 2c. The planes of the end walls 2b are preferably normal to the plane of the bottom wall 2a and the end walls are sealingly connected to the respective marginal portions of the platform 3. The platform 3 constitutes the top wall or cover of the suction chamber.

The suction chamber which includes the housing 2 and the platform 3 contains several suitably distributed subdividing elements or partitions in the form of ribs 4, 5 and 6 which can be integral with the bottom wall 2a and/or with the platform 3. The height of the partitions 4–6, as considered at right angles to the plane of the platform 3, preferably equals the height of the intermediate walls 2c, i.e., each partition preferably extends all the way from the bottom wall 2a to the inner side of the platform 3.

The apparatus 1 is designed for positioning of two different formats of sheets. The width B of the sheet 16 is the maximum width which can be handled in the improved apparatus. In addition, the apparatus can properly position narrower sheets having a width A. The latter equals the distance between the intermediate walls 2c, and the width B equals or approximates the distance between the upper and lower end walls 2b of FIG. 1. It is clear that, by providing the housing 2 with more than two intermediate walls 2c, the apparatus can be used for positioning of three or more different formats. The direction in which a wider or narrower sheet is transported stepwise is indicated by the arrow 7; such direction is parallel to the longitudinal extensions of the upper and lower end walls 2b and of the intermediate walls 2c of FIG. 1.

The first compartment of the suction chamber which is defined by the housing 2 and platform 3 is bounded by the intermediate walls 2c and the two vertically extending end walls 2b of the housing 2, as viewed in FIG. 1. Such compartment can adequately attract a sheet having the width A. If the apparatus 1 is to position sheets 16 having the width B, the entire suction chamber is connected with air evacuating means so that a wide sheet 16 is attracted to that portion of the platform 3 which overlies the first compartment as well as to those portions of the platform which overlie a two-piece second compartment having a first half extending between the upper end wall 2b and the upper intermediate wall 2c and a second half extending between the lower intermediate wall 2c and the lower end wall 2b of FIG. 1. If the width of the upper or lower half of the illustrated second compartment were doubled, the second compartment could also be formed as a one-piece compartment located above or below the first compartment, as viewed in FIG. 1.

The purpose of partitions 4 and 5 is to subdivide the compartment between the intermediate walls 2c into several sections including a centrally located main or primary section I-A and two secondary or outer sections II-A at the opposite sides of the section I-A. Analogously, the upper partitions 6 of FIG. 1 divide the upper half of the second compartment into a centrally located main or primary section I-B and two secondary or outer sections II-B disposed at the opposite sides of the section I-A. The lower partitions 6 of FIG. 1 divide the lower half of the second compartment into a main or primary section I-B and two secondary or outer sections II-B at the opposite sides of section I-B. In accordance with a feature of the invention, suction in that group of sections which includes the primary sections I-A and I-B is more pronounced, at least during the initial stage of attraction of a sheet to the outer side of the platform 3, than in the group of sections including the outer sections II-A and II-B. In other words, and assuming that a sheet having a width A overlies the platform 3 between the intermediate walls 2c, the central portion of such sheet is attracted to the primary section I-A during a first stage of transfer from the transporting plane into the copying plane, and the leading and trailing portions of such sheet are attracted to the respective portions of the platform 3 (above the outer sections II-A) during the second stage of transfer of the same sheet into the copying plane.

The partitions 6 are substantially normal to the direction (arrow 7) of transport of sheets through the copying machine. The two partitions 5 and the corresponding pairs of partitions 4 together form two substantially V-shaped composite partitions which impart to the primary section I-A a hexagonal shape. Thus, the partitions 4 and 5 are inclined with respect to the direction (arrow 7) of transport of sheets along the outer side of the platform 3.

The bottom wall 2a is formed with two openings 8 at the inlets of two suction pipes or conduits 10, and with two openings 9 at the inlets of suction conduits or pipes 11 and 11'. The outlets of the pipes 10, 11 and 11' are connected with a manifold 20 which communicates with the intake of a suction pump 13 by way of a conduit 21 containing a shutoff valve 17 and by way of a vessel 18. The openings 8 establish communication between the pipes 10 and the primary section I-A of the first compartment, and the openings 9 establish communication between the pipes 11, 11' and the primary sections I-B of the second compartment. The pipes 11 and 11' respectively contain shutoff valves 19 and 19' which are closed when the apparatus 1 is to position relatively narrow sheets (width A).

The main purpose of the partitions 4–6 is to establish relatively narrow channels or passages between the primary sections (I-A, I-B) and the outer sections (II-A, II-B) of the corresponding compartments. As shown in FIG. 1, the partitions 4 and 5 define (with each other, with the platform 3, with the bottom wall 2a and with the intermediate walls 2c) four relatively narrow flow restricting passages 14 between the sections I-A and the left-hand section II-A, and four narrow flow restricting passages 14 between the section I-A and the right-hand section II-A. Each partition 6 defines (with the bottom wall 2a, with the respective end wall 2b, with the platform 3, and with the respective intermediate wall 2c) two flow restricting passages 14' which permit air to flow between the corresponding primary section I-B and the adjacent outer section II-B.

Consequently, and since the suction pipes 10 and 11, 11' respectively communicate with the primary sections I-A and I-B, suction in these sections is more pronounced than in the outer sections II-A and II-B with the result that the median or central portion of a wider or narrower sheet is attracted to the platform 3 during the initial stage and the remaining portions of a sheet are attracted to the platform during the next-following stage of transfer of a sheet from the transporting plane into the copying plane.

The combined cross-section (area S-AI) of perforations or ports 15 in that portion of the platform 3 which overlies the primary section I-A exceeds the combined cross-sectional area of passages 14. Analogously, the combined cross-sectional area (S-BI) of those perforations or ports 15 in the platform 3 which overlie a primary section I-B exceeds the combined cross-sectional area of the respective (four) passages 14'. The number of ports 15 per unit area of that portion of the platform 3 which overlies the sections I-A, I-B is greater than the number of ports is per unit area of those portions of the platform which overlie the sections II-A and II-B. In accordance with a presently preferred embodiment of the invention, the combined cross-sectional area of ports 15 which communicate with the sections I-A and I-B is between 30 and 60 percent of the corresponding portion of the outer side of the platform 3 (most preferably about 45 percent). Also, the combined cross-sectional area of ports 15 in communication with the sections II-A and II-B is between 5 and 15 percent (most preferably 10 percent) of the corresponding portions of the outer side of the platform 3.

The operation:

It is assumed that the apparatus 1 is to attract a relatively narrow sheet (width A). Thus, the valves 19, 19' are closed and the valve 17 is open so that the intake of the suction pump 13 communicates directly with the main section I-A of the first compartment (I-A + II-A) by way of the vessel 18, conduit 21, manifold 20 and pipes 10. The number of ports 15 in that portion of the platform 3 which overlies the section I-A is large; therefore, the main impact of suction in the first compartment is felt by that portion of the narrow sheet which is adjacent to the section I-A. In other words, suction which developes in the section I-A attracts a strip-shaped portion of the sheet which extends substantially transversely of the direction 7; such strip-shaped portion of the sheet has its rear edge along the V-shaped line defined by the left-hand partitions 4, 5 and its foward edge along the V-shaped line defined by the right-hand partitions 4, 5 of FIG. 1. The valve 17 can be opened in automatic response to placing of a fresh length of a narrow web to a position of register with the platform 3. During the initial stage of transfer of a narrow sheet from the transporting plane into the copying plane, practically the entire output of the pump 13 is used to attract the aforementioned central strip-shaped portion of the sheet to that portion of the platform 3 which overlies the primary section I-A. When the central portion of the sheet adheres to the platform 3, i.e., when the ports 15 which communicate with the primary section I-A are sealed from the outside, suction propagates itself into the outer sections II-A via passages 14 between the respective sets of partitions 4 and 5. This will be readily appreciated since the ratio of the combined cross-sectional area of still unsealed ports 15 (if any) which communicate with the primary section I-A to the combined cross-sectional area of the left-hand or right-hand passages 14 of FIG. 1 is changed drastically as soon as the sheet overlies the compartment section I-A, i.e., the combined cross-sectional area of passages 14 greatly exceeds the combined cross-sectional area of unsealed ports 15 in the group S-AI. Therefore, suction is effective in the outer sections II-A and the corresponding portions of the sheet are attracted to adjacent parts of the outer side of the platform 3. Suction in the sections II-A need not be very pronounced because the median portion of the sheet already adheres to the platform 3 (above the section I-A) and the remaining portions of the sheet are very close to the platform (i.e., closer than at the start of sheet transfer from the transporting plane into the copying plane). The speed of air streamlets flowing into ports 15 which communicate with the sections II-A decreases in directions to the right and to the left, i.e., in directions away from the respective sets of partitions 4, 5. This means that suction is more pronounced first in immediate proximity of the partitions and thereupon in regions which are more distant from the primary section I-A. Such mode of controlling the suction results in what can be termed "rolling" of the front and rear portions of the sheet onto the adjacent portions of the platform 3, i.e., the areas of contact between the front and rear portions of the sheet and those portions of the platform 3 which overlie the sections II-A increase gradually in directions toward the left-hand and right-hand end walls 2b of FIG. 1. Such rolling of the front and rear portions of the sheet further reduces the likelihood of development of creases or similar irregularities.

The ports 15 preferably form rows which are parallel to the direction indicated by arrow 7.

The situation is analogous when the outer side of the platform 3 is to be contacted by a sheet 16, i.e., by a sheet having the width B. The valves 19 and 19' are opened so that the primary sections I-B communicate with the intake of the suction pump 13 via pumps 11, 11', manifold 20, conduit 21 and vessel 18. The primary section I-A continues to communicate with the intake of the suction pump 13 so that the section I-A and the two sections I-B together form a group of three primary sections which attract the median portion of the sheet 16 to that portion of the platform 3 which extends between the upper and lower end walls 2b of FIG. 1 and is bounded by the two (left-hand and right-hand) sets of partitions 4–6. In other words, a strip-shaped median portion of the sheet 16 adheres to the platform 3 before the ports 15 in those portions of the platform which overlie the two sections II-A and the four sections II-B begin to attract the front and rear portions of the sheet 16. Thus, the first stage of transfer of a sheet 16 from the transporting plane into the copying plane involves transfer of a strip-shaped median portion of the sheet 18, and the second stage involves the transfer of the front and rear portions of the sheet 16, again by causing the front and rear portions to roll onto the corresponding portions of the outer side of platform 3.

The V-shaped configuration of the two sets of partitions 4 and 5 in the first compartment (between the intermediate walls 2c) is possible due to the fact that the selected distance between the openings 8 is reasonably large. If this distance were reduced, the partitions 4 and 5 could be placed in line with the respective partitions 6, i.e., the partitions 4 and 5 could also extend at right angles to the direction of travel of sheets past the platform 3. The number of closely adjacent ports 15 (groups S-AI) is then reduced accordingly, i.e., such ports communicate only with the primary section I-A.

The space between the platform 3 and the bottom wall 2a of the housing 2 further contains reinforcing elements 5a which extend midway between the intermediate walls 2c in parallelism with the direction indicated by arrow 7. The purpose of the reinforcing elements 5a (each of which is shown in the form of an elongated rib) is to serve as back supports for the corresponding portions of the platform 3 and to thus prevent buckling of the platform in response to rapid and pronounced reduction of pressure in the sections II-A of the first compartment. In order to simplify the making of elements 5a, they are preferably integral with the nearest partitions (5). It is clear that the number of elements 5a can be increased and that such elements can be distributed and/or oriented in a manner other than that shown in FIG. 1; this depends on the rigidity of platform 3 as well as on the area of those portions of the platform which overlie the sections II-A. If necessary, one or more reinforcing elements can be provided in the section I-A, in one or both sections I-B and/or in one or more sections II-B. Furthermore, the elements 5a may constitute discrete inserts or they may form integral parts of the bottom wall 2a, one or more end walls 2b, one or more intermediate walls 2c and/or platform 3.

The improved procedure of multi-stage or multi-phase transfer of sheets from the transporting into the copying plane is preferably carried out in such a way that, during the first stage, suction is applied exclusively (or almost exclusively) to a small fraction (preferably between 5–15 percent and most preferably approximately 10 percent) of the entire area of a sheet which is in register with the platform 3. The second stage involves the application of suction to the remaining (approximately 90 percent) of such area. The distribution of suction upon a relatively large area of a sheet during the second stage of transfer does not affect the accuracy of transfer into the copying plane because, and as mentioned above, the first stage involves at least some movement of the major portion of a sheet toward the exposed outer side of the platform 3 so that the larger area of the sheet is transferred during the second stage without the formation of creases or pleats.

An important advantage of the just discussed multi-stage transfer of sheets into the copying plane is that the output of the pump 13 need not exceed a very small fraction of the output of suction pumps which are used in heretofore known apparatus wherein suction is applied to the entire sheet in a single step, i.e., immediately when the transfer of a sheet from the transporting plane into the copying plane is to begin. In fact, the pump output which is furnished during the first stage of transfer of a sheet in the apparatus of the present invention is usually excessive, i.e., it is greater than that necessary for rapid and predictable transfer of the central portion of a sheet so that the latter overlies the section I-A or the sections I-A and I-B. Otherwise stated, the output which is to be furnished during the transfer of central portion of a sheet into the copying plane is greater than the output which is needed for proper transfer of the remaining (major) portion of the sheet during the next-following or second stage. Therefore, the apparatus of the present invention may comprise means which serves as a booster of the action of pump 13 during the initial stage so that the output of the pump can be selected to match that value which is needed during the second stage. The aforementioned vessel 18 constitutes one form of a booster which can be used in accordance with the invention. This vessel is being evacuated while the motor M for the pump 13 is in operation during intervals between the transfer of successive sheets into the copying plane. Thus, when a sheet is to be transferred to overlie the platform 3, the pressure in the vessel 18 is very low. As the valve 17 opens, the pressure in the section I-A (or in the sections I-A and I-B, depending upon whether or not the valves 19 and 19' are open) drops very rapidly so that the suction in compartment(s) I-A (and I-B) drops immediately to insure reliable transfer of the central portion of a sheet having the width A or B. Such drop of pressure in the sections I-A and I-B is more pronounced than that which would be achievable in the absence of the vessel 18 (assuming that the output of the suction pump 13 were the same). The valve 17 is preferably opened abruptly so that the evacuation of air from the section I-A or sections I-A and I-B begins suddenly and results in immediate transfer of the central portion of a sheet into the copying plane.

The fact that the pressure in the vessel 18 rises subsequent to completion of the first stage of transfer of a sheet is of no consequence since the second stage can be readily effected without resorting to pronounced suction. It can be said that the provision of vessel 18 results in savings (as regards the energy requirements and size of the pump 13) which are proportionate to the difference between suction which is needed for proper transfer of a central sheet portion and proper transfer of the remaining portion of a sheet.

The vessel 18 can be omitted if that portion of the conduit means 21, 20, 11', 11, 10 which is located between the intake of the pump 13 and the valves 17, 19, 19' is large enough to constitute a functional equivalent of a vessel, i.e., if the capacity of such portion is large enough to insure that pressure in the section I-A or in the sections I-A and I-B drops abruptly to the desired level in response to opening of the valve 17 or in response to opening of valves 17, 19 and 19'. For example, the conduit 21 may include a relatively long large-diameter portion between the valve 17 and the intake of the suction pump 13; such portion of the conduit 21 then constitutes a vessel. The motor M for the pump 13 is preferably operated without interruptions so that the vessel is evacuated during intervals between the transfer of successive sheets into the copying plane.

As shown in FIG. 1, that portion of the platform 3 which overlies the openings 9 is not perforated. This contributes to more uniform distribution of suction in the entire section I-B. Though not shown, the same can hold true for the platform portions which overlie the openings 8.

The output of the pump 13 can constitute a small fraction (e.g., 30 percent) of the output of pump or pumps which are used in conventional apparatus for sidewise transfer of sheets by suction. This results in very substantial savings in energy and in practically noiseless operation of the apparatus. Moreover, and since the RPM of the motor M for the pump 13 can be a small fraction of the RPM of motors which drive the pumps of conventional apparatus, the likelihood of vibration and other stray movements of the copying machine is greatly reduced. Thus, whereas the motor for the pump in a conventional apparatus is driven at 12,000 RPM, the RPM of the motor M need be driven at 2,800 RPM or less. This contributes to longer useful life of the motor-pump aggregate.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. Apparatus for transferring sheets from a predetermined position in a first plane into a second plane, particularly for transferring sheets into the copying plane of a photographic copying machine, comprising a suction chamber including a perforated wall having an outer side which defines said second plane and is in register with a sheet in said predetermined position; means for evacuating air from said chamber whereby air which flows into said chamber by way of perforations in said wall attracts and effects the transfer of a sheet from said first into said second plane; means for subdividing the interior of said chamber into at least two groups of sections one of which directly communicates with said evacuating means and each of which communicates with different perforations of said wall, said subdividing means including partitions separating the other of said groups from said one group and having respective passages therein which permanently and indirectly communicate said other group with said evacuating means via said one group and which have such dimensions as to offer substantial resistance to the outflow of air from said other into said one group whereby that portion of a sheet in said predetermined position which is adjacent to perforations communicating with said one group of sections is transferred into said second plane prior to transfer of that sheet portion which is adjacent to perforations communicating with said other group of sections.

2. Apparatus as defined in claim 1, wherein said first plane is a transporting plane wherein the sheets are movable stepwise in a predetermined direction, said one group of sections extending substantially transversely of said direction.

3. Apparatus as defined in claim 1, wherein the area of that portion of said outer side of said wall which overlies said one group of sections is a small fraction of the area of that portion of said outer side which overlies said other group of sections.

4. Apparatus as defined in claim 1, wherein said one group includes a single section and said other group includes two sections disposed at the opposite sides of said single section.

5. Apparatus as defined in claim 1, wherein said wall constitutes a substantially plate-like cover of said suction chamber.

6. Apparatus as defined in claim 1, wherein said first plane is a transporting plane wherein the sheets are movable stepwise in a predetermined direction and said perforations form at least one row extending in parallelism with said direction.

7. Apparatus as defined in claim 1, wherein the number of perforations per unit area of that portion of said wall which is adjacent to said one group of sections is greater than the number of perforations per unit area of that portion of said wall which is adjacent to said other group of sections.

8. Apparatus as defined in claim 7, wherein the combined cross-sectional area of perforations communicating with said one group of sections is between 30 and 60 percent of the corresponding portion of said outer side.

9. Apparatus as defined in claim 8, wherein said combined cross-sectional area is approximately 45 percent of said portion of said outer side.

10. Apparatus as defined in claim 7, wherein the combined cross-sectional area of perforations in communication with said other group of sections is between 5 and 15 percent of the corresponding portion of said outer side.

11. Apparatus as defined in claim 10, wherein said combined cross-sectional area is approximately 10 percent of said portion of said outer side.

12. Apparatus as defined in claim 1, wherein said evacuating means comprises a pump and means for directly connecting said pump with said one group of sections.

13. Apparatus as defined in claim 1, wherein said suction chamber includes a second wall located opposite said first mentioned wall and said elements are partitions extending between said walls and defining with said walls and with each other narrow passages for the flow of air between said one and said other group of sections, the combined cross-sectional area of said passages being less than the combined cross-sectional area of perforations in communication with said one group of sections.

14. Apparatus as defined in claim 1, wherein said evacuating means comprises a suction pump having an intake, a vessel communicating with said intake, and means for connecting said vessel with said one group of sections.

15. Apparatus as defined in claim 14, wherein said connecting means includes at least one shutoff valve.

16. Apparatus as defined in claim 15, further comprising means for continuously operating said pump so that the pump evacuates air from said vessel while said valve is open or closed.

17. Apparatus for transferring sheets from a predetermined position in a first plane into a second plane, particularly for transferring sheets into the copying plane of a photographic copying machine, comprising a suction chamber including a perforated wall having an outer side which defines said second plane and is in register with a sheet in said predetermined position; means for evacuating air from said chamber whereby air which flows into said chamber by way of perforations in said wall attracts and effects the transfer of a sheet from said first into said second plane; and means for subdividing the interior of said chamber into at least two groups of sections each of which communicates with said evacuating means and with the respective perforations of said wall, said subdividing means including elements which offer lesser resistance to the outflow of air from each section of one or said groups and greater resistance to the outflow of air from each section of the other of said groups whereby that portion of a sheet which is adjacent to perforations communicating with said one group of sections is transferred into said second plane prior to transfer of that sheet portion which is adjacent to perforations communicating with said other group of sections; and wherein said evacuating means comprises a suction pump having an intake, conduit means connecting said intake with said one group of sections, a shutoff valve in said conduit means, and means for continuously operating said pump, said conduit means including a portion disposed between said intake and said valve and the volume of said portion of said conduit means being sufficiently large to effect an abrupt drop of pressure in said one group of sections, on opening of said shutoff valve, as a result of evacuation of air from said portion of said conduit means while said valve is closed.

18. Apparatus as defined in claim 1, wherein said portion of said conduit means includes or constitutes a vessel.

19. Apparatus as defined in claim 1 for transferring larger and smaller sheets, wherein said one group of sections includes at least one first section which registers with a first portion of a smaller sheet in said predetermined position and at least one second section which, together with said first section, registers with a first portion of a larger sheet in said predetermined position, said other group of sections including at least one first section which registers with the remaining portion of a smaller sheet and at least one second section which, together with said last mentioned first section, registers with the remaining portion of a larger sheet.

20. Apparatus as defined in claim 19, wherein said one group includes a single first section and two second sections disposed at the opposite sides of said last mentioned first section.

21. Apparatus as defined in claim 20, wherein said other group includes two first sections disposed at the opposite sides of the first section of said one group, and one pair of second sections for each second section of said one group, each second section of said one group being disposed between the sections of one of said pairs of second sections of said other group.

22. Apparatus for transferring larger and smaller sheets from a predetermined position in a first plane into a second plane, particularly for transferring sheets into the copying plane of a photographic copying machine, comprising a suction chamber including a perforated wall having an outer side which defines said second plane and is in register with a sheet in said predetermined position; means for evacuating air from said chamber whereby air which flows into said chamber by way of perforations in said wall attracts and effects the transfer of a sheet from said first into said second plane; and means for subdividing the interior of said chamber into at least two groups of sections each of which communicates with said evacuating means and with the respective perforations of said wall, said subdividing means including elements which offer lesser resistance to the outflow of air from each section of one of said groups and greater resistance to the outflow of air from each section of the other of said groups whereby that portion of a sheet in said predetermined position which is adjacent to perforations communicating with said one group of sections is transferred into said second plane prior to transfer of that sheet portion which is adjacent to perforations communicating with said other group of sections; wherein said one group of sections includes at least one first section which registers with a first portion of a smaller sheet in said predetermined position and at least one second section which, together with said first section, registers with said first portion of a larger sheet in said predetermined position, said other group of sections including at least one first section which registers with the remaining portion of a smaller sheet and at least one second section which, together with said last mentioned first section, registers with the remaining portion of a larger sheet; and wherein said evacuating means comprises a pump having an intake, first conduit means connecting said intake with said first section of said one group, second conduit means connecting said intake with the second section of said one group, and shutoff valve means in said second conduit means so that said second section of said one group can be sealed from said intake during transfer of a smaller sheet from said predetermined position into said second plane.

* * * * *